United States Patent [19]

Smith et al.

[11] 4,423,753

[45] Jan. 3, 1984

[54] FLANGE PROTECTOR

[76] Inventors: John S. Smith; Donald R. Rogers, both of 809 Kansas, South Houston, Tex. 77587

[21] Appl. No.: 408,136

[22] Filed: Aug. 16, 1982

[51] Int. Cl.³ .............................................. B65D 59/06
[52] U.S. Cl. ................................... 138/89; 138/96 R
[58] Field of Search ....................... 138/89, 96 R, 109

[56] References Cited

U.S. PATENT DOCUMENTS

| | | | |
|---|---|---|---|
| 1,903,220 | 3/1933 | Lemert | 138/96 R |
| 2,028,576 | 1/1936 | Van Dyke | 138/96 R |
| 2,082,144 | 6/1937 | Bowers | 138/96 R |
| 3,233,502 | 2/1966 | Fernberg | 85/80 |
| 3,233,503 | 2/1966 | Fernberg | 85/80 |
| 3,463,196 | 8/1969 | Richardson | 138/96 R |
| 3,563,277 | 2/1971 | Klipper | 138/96 R |
| 3,703,194 | 11/1972 | Giordano | 138/109 |
| 3,856,050 | 12/1974 | Rooney | 138/96 R |
| 3,921,673 | 11/1975 | Pero | 138/109 |
| 3,942,680 | 3/1976 | Seeley | 220/324 |
| 3,942,681 | 3/1976 | Richardson | 220/324 |
| 4,014,368 | 3/1977 | Nelsen | 138/109 |

Primary Examiner—John W. Shepperd
Attorney, Agent, or Firm—Pravel, Gambrell, Hewitt, Kirk & Kimball

[57] ABSTRACT

A flange protector (P) is adapted for attachment to a machined surface (S) of a flange (F) of the type having an annular ridge (20) and a plurality of bolt holes (14), which bolt holes (14) extend from surface (S) through the flange. A cover (10) of flexible material has one side (10s) shaped substantially conforming to the shape of the machined surface (S) and extends over the bolt holes (14) to engage and protect the machined surface (S). A plurality of fastening means (M) extend from the engaging side (10s) of the cover (10) for frictionally engaging the interior surface (14i) of bolt holes (14) to retain the engaging side (10s) in engagement with surface (S). Each fastening means (M) includes an elongated tubular shank (12) extending from the cover (10) to an open end (12e). Each tubular shank (12) is hollow, having an inner bore (12b) substantially from the cover (10) to the open end (12e). The length of tubular shank (12) is shorter than the length of the bolt holes (14) which extend through the flange to avoid inadvertent unseating of the protector.

2 Claims, 4 Drawing Figures

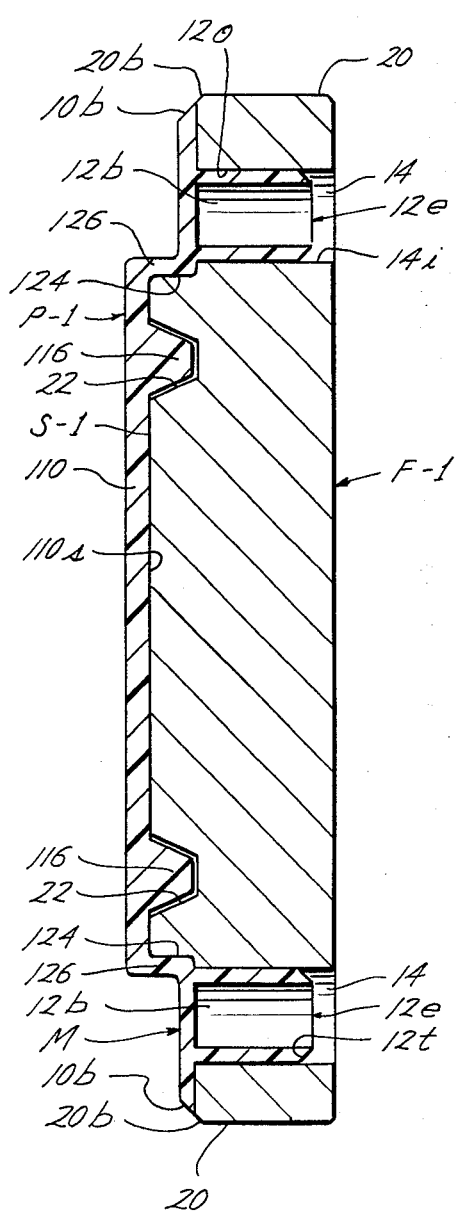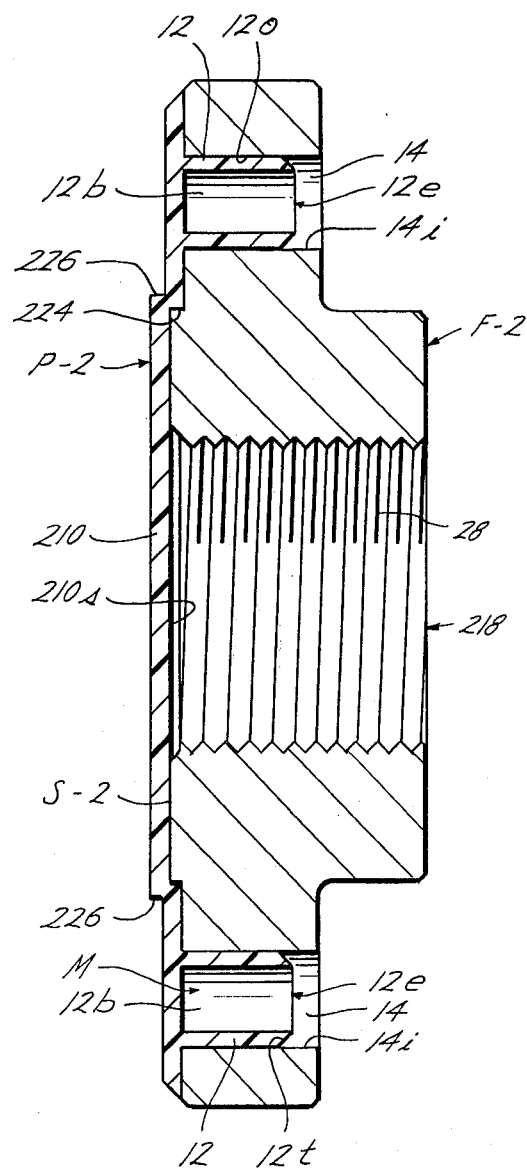

FLANGE PROTECTOR

BACKGROUND OF THE INVENTION

1. Field of the Invention

This invention relates to the field of flange protectors for attachment to a machined surface of a flange, and more particularly to improved flange protectors constructed from resilient materials and attached to a flange by frictional engagement.

2. Description of the Prior Art

Fluid handling devices such as pumps, valves and pipes customarily have flanges on their ends to make fluid-tight connections. These flanges often have machined surfaces with a plurality of bolt holes for use in attaching adjacent flanges or devices together.

In order to maintain a fluid-tight connection, the flanges are frequently protected during their transportation by having a flange protector attached to the machined surface. One such flange protector was disclosed in U.S. Pat. No. 4,014,368, which was a one piece protector made from a flexible impact-resistant material. A cover that engaged the outer surface of the flange was installed and removed by finger pressure on the exposed closed ends of integral hollow thimble-like fasteners which frictionally engaged the walls of the bolt holes of the flange. The thimble-like fasteners had open upper ends and closed lower ends protruding through the bottom of the bolt hole and accessible to finger pressure for pushing the fasteners out of the holes. The length of the body of the thimble-like fasteners was individualized for each flange such that the bottom portion extended through the hole for accessibility to finger pressure. Because the thimble-like fastener protruded from the flange, the flange protector was exposed to possible inadvertent unseating from the flange.

U.S. Pat. No. 3,856,050 disclosed another flange protector that had a plate of flexible material for attachment to a machined surface of the flange. A plurality of elongated connector means with bulbous end portions were integrally molded with the plate. The elongated connector means engaged the bolt openings and the bulbous portions held the protector in position on the flange. To remove the protector from the flange, the head portion or bulbous portion was severed from the connector means, allowing the protector to slide off the flange. The exposed bulbous portion was susceptible to being unintentionally severed which allowed the flange protector cover to be separated from the machined surface flange and exposed the machined surface to damage.

U.S. Pat. No. 3,942,681 disclosed a flange protector that had a disk covering the machined surface of the flange with a plurality of plugs on the disk which fitted closely within certain bolt holes. Additionally, fasteners were extended through the plug and bolt hole for bending the end of the fastener to retain the disk in place. The disk had an annular ridge to substantially fill a groove ring in the machined surface of the flange. To remove the flange protector, the ends of the fasteners were bent down and the disk lifted from the flange. The fasteners were thin sheet metal strips having enlarged heads with bendable lower portions. The fasteners were in a metal-to-metal contact with the interior surface of the bolt holes in the flange.

U.S. Pat. No. 3,563,277 disclosed a flange protector formed from a plastic plate that had holes for alignment with the holes in the flange. At least a pair of separate and removable retaining plugs fitted through the holes in the plate and held the plate in contact with the machine surface by frictionally engaging with the inner surface of the flange bolt holes.

Other flange protectors and thread protectors are generally described in U.S. Pat. Nos. 3,921,673; 3,463,196; 2,082,144; 2,028,576; and, 1,903,220. Patent No. 3,921,673 disclosed a protective insert for a line flange conduit used at the juncture of the flange and the conduit. U.S. Pat. No. 3,463,196 disclosed a thin ring flange protector that had plugs extending from one side for fitting within certain of the flange holes. The ring also had annular ridges for disposal within grooves in the machine surface of the flange. U.S. Pat. No. 2,028,576 disclosed a metal cap that had a narrow annular flange to overlie the end of the pipe for securing the cap to the pipe. U.S. Pat. No. 2,082,144 disclosed a thread protector particularly for threaded box and joint ends of sucker rods.

U.S. Pat. No. 3,942,680 disclosed a cap for use in spray painting. U.S. Pat. No. 3,233,502 and 3,233,503 disclosed generally resilient fasteners with hollow shanks to secure two members together.

The present flange protector frictionally engages the interior wall surface of the bolts holes in the flange to maintain the cover in contact with the machined surface of the flange. The integral tubular shanks which extend from the cover have an open end and are shorter than the length of the bolt holes in order that the tubular shanks do not protrude from the flange. Since the ends of the tubular shanks are not exposed beyond the bolt holes. The cover cannot be unseated unless a force is applied internally of the shanks, whereby inadvertent unseating of the cover is inhibited.

SUMMARY OF THE INVENTION

The present invention relates to a new and improved flange protector adapted for attachment to a machined surface of a flange of the type having an annular edge and a plurality of bolt holes extending through the flange. A cover of flexible material has one side shaped so as to substantially conform to the shape of the machined surface and extending over the bolt holes for engaging substantially all of the machined surface. A plurality of fastening means extends from the side of the cover which engages the machined surface for frictionally engaging the inner wall or surface of the bolt holes to frictionally retain the cover in the desired engagement with the entire machined surface. Each of the integral fastening means includes an elongated tubular shank, each of which extends from the cover and has an open end. The tubular shank is substantially hollow and has a shorter length than the length of the bolt holes in the flange being protected.

Since the shanks do not extend through the bolt holes of the flange, the tubular shanks are not unseated or disengaged from the machined surface of the flange unless a positive force is applied internally of the shanks, thereby inhibiting inadvertent unseating of the cover relative to the machined surface of the flange. When desired, the flange protector is removed by inserting a tool or a finger into the lower end of the bolt hole and pushing against the cover until the tubular shanks are released from their frictional engagement with the interior wall or surface of the bolt holes.

BRIEF DESCRIPTION OF THE DRAWINGS

FIG. 3 is another embodiment of the flange protector in seated position on a sealing flange plate having an annular groove; and, FIG. 4 is yet another embodiment of the present flange protector in seated position on a flange having an annular shoulder, and a centrally disposed threaded bore.

DESCRIPTION OF THE PREFERRED EMBODIMENT

Figure 1:
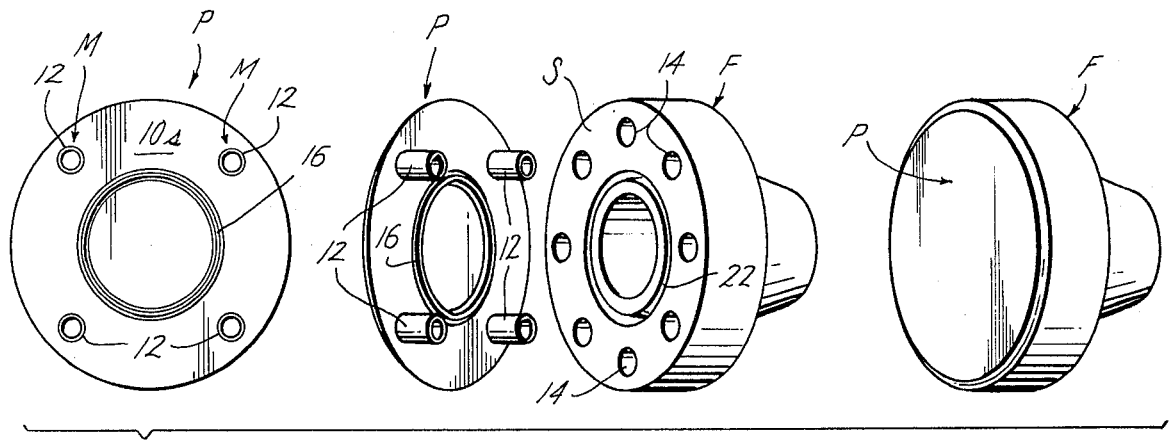
FIG. 1 is a series of views showing in sequence from left to right the present flange protector as it is positioned in the seated position on a flange.

Referring now to the drawings, a flange protector P is adapted for attachment to a machined surface S of a flange F of the type having an annular edge 20 and a plurality of bolt holes 14, with the bolt holes 14 extending from surface S through the flange.

The protector P includes a cover 10 of flexible material such as molded polyethylene, polystyrene or rubber which has one side 10s shaped so as to substantially conform to the shape of the machined surface S. The cover 10 extends over the bolt holes 14 and preferably the entire surface S for engaging and protecting such machined surface S. At least one fastening means M extends from the engaging side 10s of the cover 10 for frictionally engaging at least a portion of the interior wall or surface 14i of a bolt hole 14 to retain the engaging side 10s in the desired engagement with the machined surface S. Each fastening means M includes an elongated tubular shank 12 which extends from the cover 10 to an open end 12e. Each tubular shank 12 is hollow having an inner bore 12b substantially from the cover 10 to the open end 12e. Each tubular shank 12 has a length shorter than the length of the bolt hole 14 in which it is positioned.

FIG. 1 shows a preferred embodiment of the flange protector P of the present invention in the sequence of views from left to right, with the protector shown in a front or elevational view at the extreme left, and in an unassembled position with the flange in the center perspective view, and in the assembled position with the flange in the extreme right perspective view. The cover 10 has an annular ridge 16 on the engaging surface 10s for substantially filling an annular groove 22 formed in the machined surface S of flange F. A plurality of the fastening means M is preferably provided and preferably a fastening means M is provided for at least four spaced apart bolt holes 14, and each of which fastening means M extends from the cover 10 and is aligned with one of the bolt holes 14 such that the pressing of the fastening means M into the corresponding holes 14 brings the engaging surface 10s into frictional engagement with the machined surface S of flange F.

Figure 2:
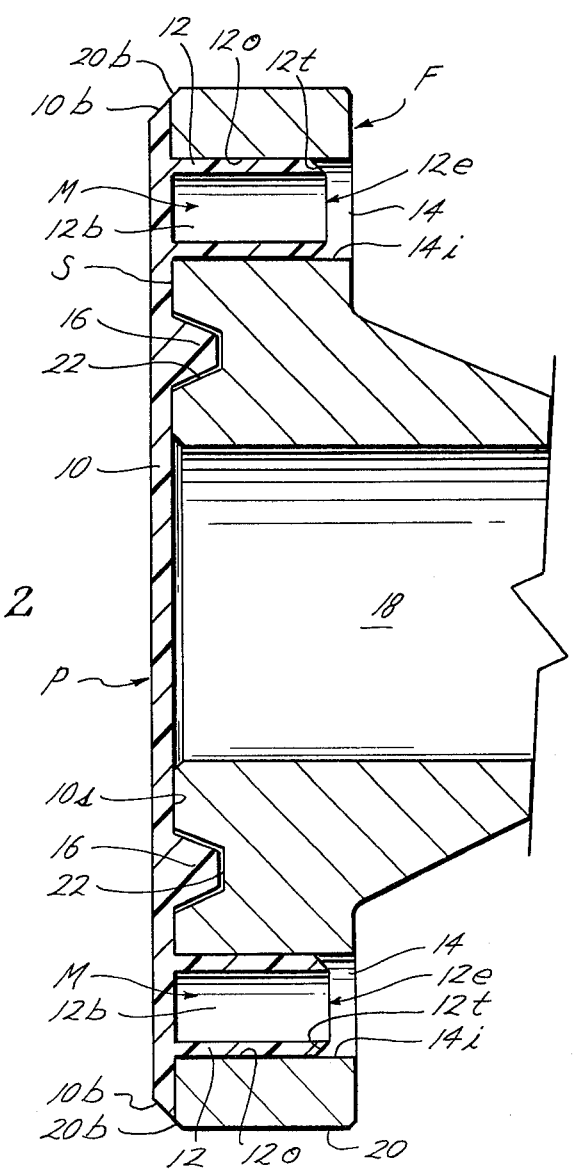
FIG. 2 is a cross-sectional view of the present flange protector engaging a flange having an annular groove therein, a plurality of bolt holes, and a centrally disposed bore.

Referring more particularly to FIG. 2 wherein the embodiment of the protector P shown in FIG. 1 is further illustrated, it can be seen that the annular edge 20 of flange F has a beveled or tapered edge 20b adjacent to the machined surface S. The cover 10 has a tapered or beveled edge 10b which is tapered to conform to the beveled edge 20b of flange F. When protector P is attached, the edges 10b and 20b form a continuous surface to reduce the opportunity for inadvertent prying of the flange protector P away from the machine surface S of flange F.

The cover 10 in FIG. 1 is shown to be flat; however, if the present flange protector P is molded from polyethylene or the like, the cover 10 may not be flat. After the flange protector P is removed from the mold, some shrinkage and warping in cover 10 may occur during cooling of the flange protector P. The fastening means M remain in substantial alignment with the bolt holes 14. When the plurality of fastening means M are pressed into frictional engagement with the bolt holes 14, the cover 10 is brought into conformance and tight engagement with the machined surface S and any warpage disappears.

Operation

A flange protector P of the present invention is first molded or otherwise formed such that the engaging surface 10s conforms to the shape of the machined surface S and the fastening shanks 12 align with the bolt holes 14. Each one of the plurality of fastening means M of the flange protector P is then aligned with one of the corresponding bolt holes 14. Once aligned, the protector P is pressed by hand or other suitable means into engagement with the machined surface S. The frictional engagement between the outer surface 12o of the shanks 12 with the inner wall or surface 14i of bolt holes 14 retains protector P tightly in engagement with flange F.

To disengage the flange protector P from flange F, a tool having a blunt end, such as a rod, screwdriver or the like, or a person's finger is inserted into each bore 12b of each tubular shank 12 to force the protector P out of seated engagement with bolt holes 14 and machined surface S and allowing the removal of the protector P from the flange F.

Alternative Embodiments

FIGS. 3 and 4 are two alternative embodiments of the present flange protector P of FIG. 2. All of the parts in FIGS. 3 and 4 bear the same letters and numerals as the corresponding parts in FIG. 2, except those that have been modified, and they have the same numerals preceded by the numeral "1" for FIG. 3 and the numeral "2" for FIG. 4. Flange protector P-1 of FIG. 3 is engaged with the machined surface S-1 of flange F-1. Flange F-1 is of the plate-type which seals a complementary flange. Machined surface S-1 has shoulders 124 positioned between annular groove 22 and bolt holes 14. Correspondingly, cover 110 of protector P-1 is formed with shoulders 126 and annular ring 116 to conform the shape of the engaging surface 110s to the shape of the machined surface S-1.

The flange protector P-2 of FIG. 4 engages flange F-2 having threads 28 in an interior bore 218 and having shoulders 224 positioned between bolt holes 14 and bore 218. Correspondingly, cover 210 is formed with shoulders 226 bringing engaging surface 210s into substantial conformance with the shape of machined surface S-2.

Fastening means M in FIGS. 3 and 4 are the same as described above with reference to FIG. 2 and frictionally engage the interior 14i of bolt holes 14.

The operation of the flange protectors P-1 of FIG. 3 and P-2 of FIG. 4 is the same as described above with reference to the flange protector P of FIG. 2.

The foregoing disclosure and description of the invention are illustrative and explanatory thereof, and various changes in the size, shape and materials, as well as in the details of the illustrated construction may be made without departing from the spirit of the invention.

We claim:

1. A flange protector adapted for attachment to a flange of the type having a machined surface, an annular edge and a plurality of bolt holes, the bolt holes extending through the flange, comprising:

a circular shaped cover of flexible material having an outer annular beveled edge;

said cover having one side formed to conform to the shape of the machined surface of the flange and extending over and closing the upper ends of the bolt holes and having said annular beveled edge disposed at the annular edge of the flange so that the cover engages the entire machined surface and the annular beveled edge inhibits inadvertent displacement of the cover from the flange;

a plurality of fastening means extending from said one side of said cover for frictionally engaging the inner wall of bolt holes in a flange to retain said one side of said cover in engagement with the machined surface of the flange; and, each of said fastening means includes:

an elongated tubular shank extending from said cover to an open end;

said tubular shank being hollow substantially from said cover to said open end; and, said tubular shank having a shorter length than the length of the bolt holes extending through the flange.

2. The invention of claim 1 including:

an annular ridge formed integrally on said one sid of said cover for substantially filling an annular groove in the flange.

* * * * *